United States Patent Office 3,533,971
Patented Oct. 13, 1970

3,533,971
POLYMER FORMING COMPOSITION AND
ELECTRODEPOSITION THEREOF
Richmond O. Austin, Hattiesburg, Herschel V. Bullock, Columbia, and Thomas E. McCraney, Hattiesburg, Miss., assignors to Pan American Tung Research and Development League, Hattiesburg, Miss., a corporation of Louisiana
No Drawing. Filed Feb. 2, 1967, Ser. No. 613,438
Int. Cl. C08f 27/08
U.S. Cl. 260—18                                   14 Claims

ABSTRACT OF THE DISCLOSURE

Polymer-forming compositions wherein an oxazoline ring and secondary amide group have replaced the acid radicals of a dicarboxylic acid resulting from a Diels-Alder reaction between an unsaturated oil or acid containing conjugated double bonds (tung oil, oiticica oil, eleostearic acid, etc.), and an unsaturated dicarboxylic acid, or anhydride (fumaric, maleic, etc.). These compositions are soluble in water and particularly adapted for use in the electrodeposition of films, which, after baking, are hard and resistant to the action of water and corrosive agents.

BACKGROUND OF THE INVENTION

Field of invention

The invention relates to new polymer-forming compounds and compositions particularly adapted for use in the electrodeposition of films on conducting surfaces to obtain deposits or coatings which may be characterized by their unusual hardness and resistance to chemical attack. For this purpose, the product of a Diels-Alder reaction between an unsaturated dicarboxylic acid or anhydride and tung oil, oiticica oil, eleostearic acid or the like, is heated with a polyhydric amino compound such as, tris (hydroxymethyl) aminomethane; 2-amino-2-methyl-1,3-propanediol, or the like. Water is eliminated during the heating step resulting in the formation of compounds which are soluble in water and adapted for use in electrolytic baths, with or without pigments, coloring agents and other additives. Such baths, upon electrolysis, possess high throwing power and can be operated continuously without regeneration, other than the addition of further polymeric composition thereto to replace that deposited from the bath.

The films produced on electrically conducting substrates can be readily washed and baked for a limited time and at moderate temperatures to produce smooth glossy films, or attractive wrinkled films, depending upon the conditions employed in the electrodeposition.

If desired the polymer-forming compound, or paint containing the same, may be applied to a surface by dipping, spraying, brushing or the like, prior to the baking step.

DESCRIPTION OF THE PRIOR ART

The electrodeposition of paint films has heretofore been suggested, and as described in British Pat. No. 972,-169, such paints may contain siccative oil-modified polycarboxylic acid resins which have been reacted with polymerizable vinyl monomers and rendered water soluble or dispersible by conversion into soaps by the action of amines or alkalis. However, in producing such a paint for electrodeposition, it is further necessary to employ solvents as coupling agents to control the viscosity of the bath and act as a supplemental bridging agent between the resin soap and water. Moreover, the presence of the soaps in the bath renders it necessary to add foam depressants, wetting agents, and the like to the bath. Furthermore, upon ionization of the soaps, the amine or alkali portion thereof migrates to the cathode increasing the pH of the bath and causing unbalance in the solution. As a result, the bath must be discarded after a few cycles of operation or must be subjected to difficult and expensive scavenging operations.

SUMMARY OF THE INVENTION

In accordance with the present invention hydrophilic polymer-forming reaction products are formed which ionize in solution to produce an electrolytic bath that is free of soap and does not require the addition of foam depressants, coupling agents or the like thereof. As a result, the bath can be used continuously or for long periods of time without regeneration or adjustment other than the addition of polymer concentrate to the bath to replace that deposited at the anode. The films deposited at the anode are of very high quality, they are substantially insoluble in water, and the bath has a high throwing power so that substantially complete and uniform films can be produced on electrically conducting substrates.

DESCRIPTION OF PREFERRED EMBODIMENTS OF INVENTION

The compositions of the present invention are particularly adapted for use in the electrodeposition thereof to produce films or deposits of polymerized material on the surface of electrically conducting substrates. However, they may be applied to articles by dipping, spraying or other methods if desired. For most purposes, the products are utilized in the form of aqueous solutions or dispersions which may contain pigments or other agents for coloring or modifying the appearance or properties of films embodying the polymerized product.

The principal polymerizable constituent of products embodying the present invention is a water soluble hydrophillic product obtainable by heating a Diels-Alder addition product with a polyhydroxy amine with the removal of water during the reaction. Those addition products which are suitable for use in accordance with the present invention are obtainable by reaction between unsaturated dicarboxylic acids or anhydrides and unsaturated oils or acids containing conjugated double bonds. The unsaturated acids and anhydrides which may be employed are those acids containing from 4 to 8 carbon atoms and having the general formula

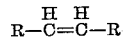

or

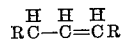

where R is a —COOH group; and those acid anhydrides of the general formula

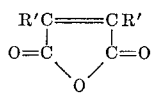

where R' is hydrogen or an alkyl group containing from 1 to 4 carbon atoms. Typical of these acids and anhydrides are maleic, fumaric, citraconic, mesaconic, itaconic, ethyl maleic, glutaconic and muconic acids and their available anhydrides.

The unsaturated oils and acids adapted for use in producing the adducts are tung oil, oiticia oil, eleostearic acid and licanic acid and mixtures of such oils and acids. In some instances, and for some purposes, limited amounts, say up to 10 or 15%, of dehydrated castor oil containing conjugated linoleic acid may be used in the oil mixtures employed in producing the adduct.

The addition reaction is preferably carried out in an inert atmosphere by heating together from about 1 to 2.5 mols of unsaturated acid for each mol of conjugated triene oil or acid employed. A reaction temperature of about 150° C. to 220° C. is suitable and the reaction is preferably continued for a period of from about 30 minutes to 2 hours, or until a drop of the reaction product, when placed on a clear glass plate and cooled to room temperature shows no particles of unreacted unsaturated acid. The acid value of the addition product expressed as milligrams of potassium hydroxide required to neutralize one gram of resin may vary from about 40 to 200.

The reaction product obtained when using one mol of fumaric or maleic acid and one mol of eleostearic acid in tung oil, contains a hexagonal ring structure and may be represented as follows:

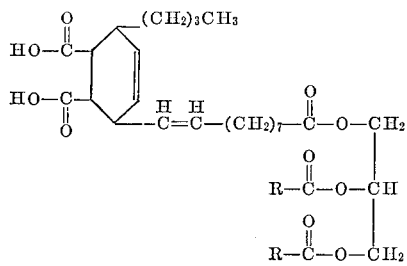

where R is a seventeen carbon acyl group consisting mostly of eleostearic or licanic acid with three conjugated double bonds at the 9, 11, and 13 carbon positions.

Two dicarboxylic acid radicals at the 4 and 5 carbon position on the ring structure are formed and become highly reactive sites. There is an additional advantage in that the formation of a cyclic structure improves hardness of the final film through more tightly packed molecules. The aliphatic long chain radicals at the 6 and especially 3 positions contribute flexibility and film forming characteristics.

As the mols of fumaric or maleic acid are increased, the number of hexagonal ring structures present in the adduct is increased thereby increasing hardness of the dried film. The number of moles of the unsaturated acid or anhydride which may be incorporated in the resulting adduct is, of course, limited by the number of conjugated double bonds available per mole of the unsaturated oil or acid employed.

The dicarboxylic acid adducts thus obtained are insoluble in water. However, in accordance with the present invention the dicarboxylic acid adducts obtained as described above are rendered water soluble or hydrophilic by heating the same with a polyhydroxy amino compound while removing water during the reaction. The polyhydroxy amino compounds used preferably contain from 2 to 5 OH groups, 1 NH₂ group, and from 4 to 10 carbon atoms. Among the preferred polyhydroxy amino compounds which may be employed are 2-amino-2-methyl-1,3-propanediol, and tris (hydroxymethyl) aminomethane.

The amount of the polyhydroxy amino compound employed in carrying out this step of the process may vary from about 8% to 40% by weight based upon the weight of the adduct and preferably is in the range of about 16% to 25%. The temperature of the reaction is preferably maintained at about 140° C. to 160° C. and preferably about 145° C. to 155° C. for a period of from about 30 minutes to 60 minutes, sufficient to cause about 1.5 mols of water of reaction per mol of tris (hydroxymethyl) aminomethane to be removed.

The removal of water converts approximately one-half of the polyhydroxy amine to an oxazoline structure attached to either the 4 or 5 position of the ring in the dicarboxylic acid adduct, whereas the remaining portion of the polyhydroxy amino compound forms secondary amide via condensation with the remaining carboxylic group of the ring. The reaction which takes place at the reactive 4 and 5 carbon positions of the dicarboxylic acid adduct may accordingly be represented as follows:

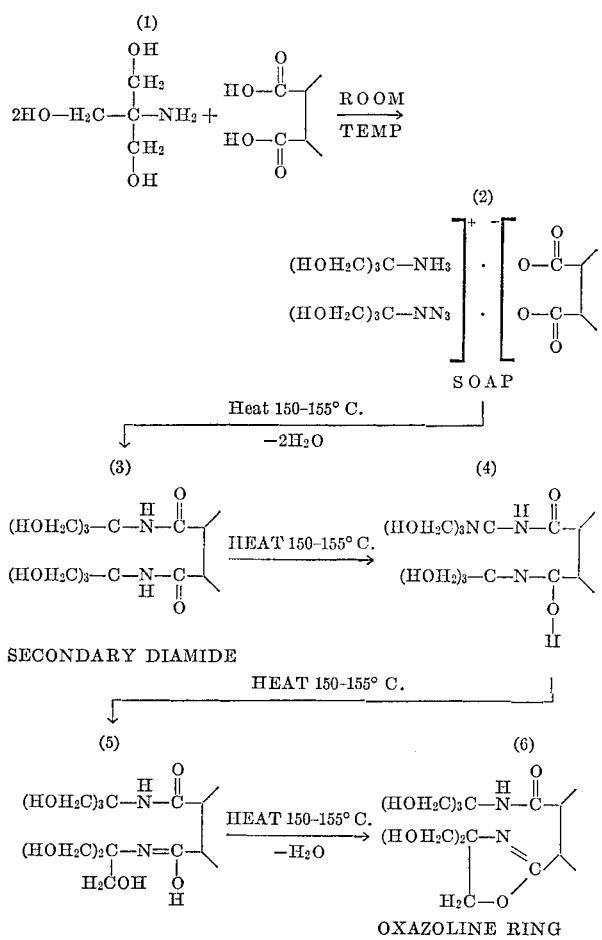

As shown in the foregoing equation, the polyhydroxy amino compound first reacts at room temperature with the carboxyl groups of the adduct to form the soap (2). Thereafter when the soap (2) is heated it decomposes with the splitting off of two molecules of water to form the secondary diamide (3). This diamide, upon further heating, undergoes rearrangement as shown at (4) and splits off an additional molecule of water (5) to form the end product (6) which contains both an oxazoline ring and a secondary amide group.

The proportion of the reactants used in producing polymer-forming composition in accordance with the present invention may be varied considerably but generally are employed within the following ranges in percent by weight based on the total weight of the composition:

|  | Permissible range | Preferred range |
|---|---|---|
| Conjugated drying oil | 55.0-77.0 | 62.7-69.3 |
| Dicarboxylic acid or anhydride | 9.0-15.0 | 10.7-14.9 |
| Hydroxy amino compound | 8.0-40.0 | 16.0-25.0 |

Removal of 1.5 mols of water per mol of tris (hydroxymethyl) aminomethane during the reaction indicated above serves to convert approximately one-half of the aminohydroxy compound used to the oxazoline structure attached to the 4 or 5 carbon atom of the ring in the dicarboxylic acid of the adduct, whereas the remaining portion thereof forms a secondary amide via condensation with the remaining carboxyl group. This secondary amide group, unlike an amine soap, is neutral and is not ionized by the electric current on electrodeposition. Therefore, the electrolytic bath does not change appreciably in its pH value as electrodeposition continues.

When tris (hydroxymethyl) aminomethane is employed in an amount equal to about 24% of the weight of the adduct, there will be approximately 5 OH radicals in the molecule of polymer forming composition. Such OH radicals serve to convert the hydrophobic adduct into a highly hydrophillic or water soluble product and as a result, it is not necessary to use additional solvents in producing a bath for electrodeposition of the polymer. The composition ionizes in water solution presenting negative groups which assure migration of the polymer-forming portion of the molecule to the anode.

In order to illustrate typical compositions and procedures which may be employed in producing the polymer-forming products of the present invention, the following examples are cited:

EXAMPLE I 333 grams of tung oil and 67 grams of fumaric acid are charged to a 3-neck, 1-liter flask equipped with an agitator, thermometer, and a source of inert gas. Heat is supplied by an electric mantle.

Inert gas is used to flush out the system and to maintain an inert atmosphere in the flask. The agitator is starter and heat applied.

The temperature is raised to 200° C. in about 60 minutes at this temperature.

Completion of the reaction is determined by placing a few drops from the flask on a piece of clear glass plate and allowing to cool. The drops are examined against a suitable light, and when no white particles of fumaric acid are observed, the reaction is considered complete.

The acid value expressed as milligrams of potassium hydroxide required to neutralize one gram of resin is 130 minimum.

The contents of the flask are cooled to 120° C. and 121 grams of tris (hydroxymethyl) aminomethane is added. The temperature is then raised to 150° C. in 40 minutes to one hour and held for 30 minutes.

The total reaction time to form the final polymer is about 1½ to two hours.

The final product is then cooled to 100° C. and thinned to about 58% non-volatile with distilled or deionized water.

The final resin before thinning will have the following approximate values:

| | |
|---|---|
| Non-volatile content, percent | 100 |
| Color, Hellige scale | 9-10 |
| Viscosity, Gardner tube | $Z_{10}+$ |
| Pounds per gallon | 9.15 |
| pH (10% non-volatile in water) | 7.4 |

EXAMPLE II 400 grams of tung oil and 66.3 grams of fumaric acid are charged into a 3-neck, 1-liter flask equipped with an agitator, thermometer, and source of inert gas. Heat is supplied by an electric mantle.

Inert gas is used to flush out the system and to maintain an inert atmosphere in the flask. The agitator is started and heat applied.

The temperature is raised to 200° C. in about 60 minutes. The haze in the flask will disappear in about 5-10 minutes at this temperature.

Completion of the reaction is determined by placing a few drops from the flask on a piece of clear glass plate and allowing to cool. When the drops are examined against a suitable light, no white particles of fumaric acid are observed and the reaction is considered complete.

The acid value expressed as milligrams of potassium hydroxide required to neutralize one gram of resin is 115 minimum.

The contents of the flahk are cooled to 120° C. and 93.3 grams of tris (hydroxymethyl) aminomethane is added.

The temperature is then raised to 150±5° C. and held for one-half hour.

The final product is then cooled to 100° C. and thinned to about 65% non-volatile with distilled or deionized water.

The final resin before thinning will have the following approximate values:

| | |
|---|---|
| Non-volatile, percent | 100 |
| Viscosity, Gardner tube | $Z_{10}+$ |
| Pounds per gallon | 9.2 |
| pH (10% non-volatile in water) | 7.05 |

At 66% non-volatile in water, the fresh solution is a partial to complete stable emulsion that becomes clear to slightly hazy on standing for three to 15 days.

EXAMPLE III 300.0 grams of tung oil and 79 grams of fumaric acid are charged to a 3-neck, 1-liter flask equipped with an agitator, thermometer, and source of inert gas. Heat is supplied by an electric mantle.

Inert gas is used to flush out the system and to maintain an inert atmosphere in the flask. The agitator is started and heat applied.

The temperature is raised to 200° C. in about 60 minutes. The haze in the flask will disappear in about 5-10 minutes at this temperature.

Completion of the reaction is determined by placing a few drops from the flask on a piece of clear glass plate and allowing to cool. The drops are examined against a suitable light and no white particles of fumaric acid are observed. Therefore, the reaction is considered complete.

The acid value expressed as milligrams of potassium hydroxide required to neutralize one gram of resin is 160 minimum.

The contents of the flask are cooled to 120° C. and 152 grams of tris (hydroxymethyl) aminomethane is added.

The temperature is then raised to 150° C. and held for 45 minutes. The reacted polymer is then cooled to 100° C. and 300 grams of distilled or deionized water is added.

The final resin before thinning will have the following approximate values:

| | |
|---|---|
| Non-volatile, percent | 100 |
| Color, Hellige scale | 9-10 |
| Viscosity, Gardner tube, 100% non-volatile | $Z_{10}+$ |
| Pounds per gallon | 9.1 |
| pH (10% non-volatile in water) | 7.2 |

EXAMPLE IV 438 grams of oiticica oil and 82 grams of fumaric acid are charged to a 3-neck, 1-liter flask equipped with an agitator, thermometer, and source of inert gas. Heat is supplied by an electric mantle.

Inert gas is used to flush out the system and to maintain an inert atmosphere in the flask. The agitator is started and heat is applied.

The temperature is raised to 210° C. at which point a mild exothermic reaction develops. This temperature is held for 10 to 20 minutes.

Completion of the reaction is determined by placing a few drops from the flask on a piece of clear glass plate and allowing to cool. The drops are examined against a suitable light, and if no white particles of fumaric acid are observed, the reaction is considered complete.

The acid value expressed as milligrams of potassium hydroxide required to neutralize one gram of resin is 110 minimum.

The contents of the flask are cooled to 120° C. and 156.1 grams tris (hydroxymethyl) aminomethane is added.

The temperature is raised to 155° C. and held 30 minutes. The contents of the flask are cooled to 100° C. and thinned with 400 grams of distilled or deionized water.

The final resin after thinning will have the following approximate values:

| | |
|---|---|
| Non-volatile, percent | 59 |
| Color, Hellige scale | 12–13 |
| Viscosity, Gardner tube | $Z$–$Z_1$ |
| Pounds per gallon | 9.0 |
| pH at 10% non-volatile | 6.9 |

Paints were prepared using polymers described in examples I, II, III and IV and utilizing pigments suitable for electrodeposition.

EXAMPLE V 250 grams of tung oil and 50 grams of fumaric acid are charged to a 3-neck, 1-liter flask equipped with an agitator, thermometer and source of inert gas. Heat is supplied by an electric mantle.

Inert gas is used to flush out the system and maintain an inert atmosphere in the flask. The agitator is started and heat applied.

The temperature is raised to 200° C. in about 60 minutes. The haze in the flask will disappear in about 5–10 minutes at this temperature.

Completion of the reaction is determined by placing a few drops from the flask on a piece of clear glass plate and allowing to cool. The drops are examined against a suitable light, and if no white particles of fumaric acid are observed, the reaction is considered complete.

The acid value expressed as milligrams of potassium hydroxide required to neutralize one gram of resin is 130 minimum.

The contents of the flask are cooled to 120° C. and 90 grams of 2-amino-2-methyl-1,3-propanediol (AMPD) is added.

The temperature is then raised to 150° C. in 40 minutes to one hour and held for 35 minutes, cooled to 100° C. and thinned with 200 grams of distilled water.

| | |
|---|---|
| Non-volatile content, percent | 64.3 |
| Viscosity, Gardner tube | Y |
| Color, Hellige scale | 10 |
| Pounds per gallon | 8.9 |
| pH, 10% solution | 7.5 |

The oxazoline content will be approximately 8% total non-volatile expressed as 2-amino-2-methyl-1,3-propanediol (AMPD).

EXAMPLE VI 400 grams of tung oil and 67.6 grams maleic anhydride are charged to a 3-neck, 1-liter flask equipped with an agitator, thermometer, and source of inert gas. Heat is supplied by an electric mantle.

Inert gas is used to flush out the system and to maintain an inert atmosphere in the flask. The agitator is started and heat is applied.

The temperature is raised to 205° C. (about one hour). On reaching this temperature, the reaction in usually complete, but it may be necessary to hold for 10–20 minutes to complete.

Completion of the reaction is determined by placing a few drops from the flask on a piece of clear glass plate and allowing to cool. The drops are examined against a suitable light. If no white particles of maleic anhydride are observed, the reaction is considered complete.

The acid value expressed as milligrams of potassium hydroxide required to neutralize one gram of resin is 40 minimum.

The contents of the flask are cooled to 120° C. and 140.3 grams of tris(hydroxymethyl)aminomethane is added. Then the temperature is raised to 155° C. held for 30 minutes, cooled to 100° C., and thinned with 300 grams of distilled water.

The final resin after thinning will have the following approximate values:

| | |
|---|---|
| Non-volatile, percent | 71 |
| Color, Hellige scale | 11–12 |
| Viscosity, Gardner Tube | $Z_7$ |
| Pounds per gallon | 9.0 |
| pH at 10% non-volatile | 7.4 |

The polymer-forming compositions produced in accordance with the foregoing examples were characterized by average molecular weights within a very narrow range—varying from about 2400 to 2700—with the result that upon electrodeposition, they will deposit at substantially the same rate.

Mixtures of tung oil and oiticica oil can be used in producing the polymer-forming compositions as above described. In some instances, limited amounts of dehydrated castor oil or the like, not to exceed about 10 or 15%, can also be used with the tung or oiticica oil. However, the electrolytically deposited films produced when non-conjugated oils are used are much less resistant to the action of water.

When producing "paints" for use in coating substrates by electrodeposition in accordance with the present invention, various concentrates were produced wherein the polymer-forming compositions of the foregoing examples were employed. These are exemplified as follows:

EXAMPLE VII 200 parts by weight of the composition of Example I and 300 parts by weight of water were blended together in a mixer with 15.7 parts of basic lead silicochromate and 50.8 parts of red iron oxide. When blended, 1500 parts of additional water were added to produce a paint solution containing 13% solids and having the following characteristics.

| | |
|---|---|
| Grind, Hegman | 5–6 |
| Color | Red |
| pH | 7.4 |
| Pigment volume conc., percent | 7.0 |

EXAMPLE VIII

| Concentrate: | Grams |
|---|---|
| Basic lead silicochromate | 31.2 |
| Pure red iron oxide | 31.2 |
| Vehicle, Example I (100% n.v.) | 200.0 |
| Distilled water | 500.0 |
| Total concentrate | 762.4 |

The ingredients were dispersed with a homomixer. Other suitable equipment can be used.

1300.0 grams of distilled water was then added to produce a paint solution containing approximately 13.0% solids.

The finished paint analysis was as follows:

| | |
|---|---|
| Grind, Hegman | 8 |
| Color | Red |
| pH | 7.05 |
| Pigment volume concentration, percent | 7.0 |

EXAMPLE IX

| Concentrate: | Grams |
|---|---|
| Carbon black dispersion (100% non-volatile) | 10.0 |
| Tribasic lead chromosilicate | 10.0 |
| Vehicle—Example I (100% solids) | 144.1 |
| Distilled water | 392.0 |
| Total concentrate | 556.1 |

Analysis of the carbon black used in this formulation is as follows:

| | |
|---|---|
| Square meters per gram | 126 |
| Fixed carbon, percent | 94 |
| Volatile matter, percent | 6 |
| pH | 4.0 |

The ingredients were dispersed in a pebble mill. Other suitable equipment can be used.

1020 grams of distilled water was then added to produce a paint solution containing approximately 10.5% solids.

Analysis of the finished paint was as follows:

| | |
|---|---|
| Grind, Hegman | 8 |
| Color | Black |
| pH | 7.6 |
| Pigment volume concentration, percent | 7.1 |

EXAMPLE X

| Concentrate: | Grams |
|---|---|
| Tribasic lead chromosilicate | 34.6 |
| Pure red iron oxide | 34.6 |
| Vehicle, Example II, 100% solids | 190.0 |
| Distilled water | 398.0 |
| Total concentrate | 657.2 |

The ingredients were dispersed in a homomixer. Other suitable equipment can be used.

1412 grams of distilled water was then added to produce a paint solution containing approximately 12% solids.

Analysis of the finished paint was as follows:

| | |
|---|---|
| Grind, Hegman | 8 |
| Color | Red |
| pH | 7.4 |
| Pigment volume concentration, percent | 7.0 |

EXAMPLE XI

| Concentrate: | Grams |
|---|---|
| Tribasic lead chromosilicate | 34.6 |
| Pure red iron oxide | 34.6 |
| Vehicle, Example III, 100% N.V. | 196.7 |
| Distilled water | 333.4 |
| Total concentrate | 599.3 |

The ingredients were dispersed in a homomixer. Other suitable equipment can be used.

1469.9 grams of distilled water was then added to produce a paint solution containing approximately 13% solids.

Analysis of the finished paint was as follows:

| | |
|---|---|
| Grind, Hegman | 8 |
| Color | Red |
| pH | 7.3 |
| Pigment volume concentration, percent | 7.0 |

EXAMPLE XII

| Concentrate: | Grams |
|---|---|
| Tribasic lead chromosilicate | 35.1 |
| Pure red iron oxide | 35.1 |
| Vehicle, Example IV, 100% N.V. | 194.6 |
| Distilled water | 435.8 |
| Total concentrate | 700.6 |

The ingredients were dispersed in a homomixer. Other suitable equipment can be used.

1370 grams of distilled water was then added to produce a paint containing approximately 13% solids.

Analysis of the finished paint was as follows:

| | |
|---|---|
| Grind, Hegman | 8 |
| Color | Red |
| pH | 7.25 |
| Pigment volume concentration, percent | 7.0 |

EXAMPLE XIII

| Concentrate: | Grams |
|---|---|
| Tribasic lead chromosilicate | 34.6 |
| Pure red iron oxide | 34.6 |
| Vehicle, Example V (64.3% N.V.) | 299.2 |
| Distilled water | 300.0 |
| Total concentrate | 668.4 |

The ingredients were dispersed with a homomixer. Other suitable equipment can be used.

1400.8 grams of distilled water were then added to produce a paint solution containing approximately 13% solids.

The finished paint analysis is as follows:

| | |
|---|---|
| Grind, Hegman | 8 |
| Color | Red |
| pH | 7.6 |
| Pigment volume concentration, percent | 7 |

EXAMPLE XIV

| Concentrate: | Grams |
|---|---|
| Tribasic lead chromosilicate | 34.6 |
| Pure red iron oxide | 34.6 |
| Vehicle, Example VI (71% non-volatile) | 273.8 |
| Distilled water | 200.0 |
| Total concentrate | 543.0 |

The ingredients were dispersed with a homomixer. Other suitable equipment can be used.

1426.2 garms of water was then added to produce a paint solution containing approximately 13% solids.

The finished paint analysis was as follows:

| | |
|---|---|
| Grind, Hegman | 8 |
| Color | Red |
| pH | 7.5 |
| Pigment volume concentration, percent | 7.0 |

While each of the paints of the foregoing examples contains tribasic lead chromosilicate or basic lead silicochromate, its use is not essential to the present invention as illustrated by the following example:

EXAMPLE XV

| | Grams |
|---|---|
| Carbon black dispersion | 53.5 |
| Vehicle, Example I, 68% N.V. | 286.0 |
| Distilled water | 200.0 |
| Total concentrate | 539.5 |

The carbon block dispersion was stirred into the vehicle and water and 1514 grams of distilled water was then added to produce a paint containing approximately 10% solids.

Instead of using pigmented "paints" or "vehicles" in the practice of the present invention, clear films of the polymer may be deposited on suitable substrates by electrodeposition if desired.

The compositions of Examples I to IV can be diluted to approximately 8–15% solids with distilled water; 10% to 20% alkylated melamine-formaldehyde resin based on solids known to the art as Cymel 7273–7 and made by American Cyanamid Company or similar compositions can be added, if desired, for fast cross-linking during the film baking process and eliminate any tendency of the film to sag. A highly uniform clear coating resistant to aromatic solvents, denatured alcohol, and a 1% by weight potassium hydroxide solution is obtained.

EXAMPLE XVI

|  | Grams |
|---|---|
| Example I vehicle (100% solids) | 200.0 |
| Alkylated melamine-formaldehyde resin (80% solids) | 20.0 |
| Distilled water | 1880.0 |
|  | 2100.0 |

When employing the paints of the present invention for applying films to a substrate by electrodeposition, the amount of the polymer-forming composition in the paint may vary from about 3 to 20% by weight thereof and the following conditions are preferably maintained:

|  | Permissible range | Preferred range |
|---|---|---|
| Volts potential per sq. inch surface | 1–20 | 1.7–8.5 |
| pH of bath | 6.5–8.6 | 6.9–7.7 |
| Temperature, °C | 4–82 | 18–27 |

And the bath composition may have the following properties:

|  | Permissible range | Preferred range |
|---|---|---|
| Total solids content, percent | 4–21 | 6–14 |
| Total Pigment content by wt. on total solids | 3–15 | 4–8 |
| Total vehicle by wt. on total solids content | 85–99 | 92–96 |

When depositioning a film on both sides of a steel panel 3″ by 5″, the panel may be placed about 1 inch from the cathode.

In using the "paints" of Examples VIII to XVI above in the electrodeposition of films on a substrate at room temperature (75° F.), potentials ranging from about 25 to 250 volts and preferably about 50 to 150 volts are used. The bath may be agitated, if desired, to prevent flocculation thereof.

When the polymer-forming composition in water solution is subjected to the action of an electrical current as indicated above, additional oxazoline rings are formed and it would appear that additional polymerization takes place at the anode to produce the desired film on the substrate. At the same time, labile hydrogen migrates to the cathode to complete the circuit. The oxazoline content is rapidly increased in the first five seconds of operation due to the fact that most all of the deposition takes place in this short period of time. It is believed that this fact confirms the theory that the ionized polymer-forming molecule gives up its charge when deposited on the anode and then undergoes additional oxazoline formation and cross-linkage in forming a film on the substrate whereby the film becomes completely insoluble in water. Infra-red spectrophotometer techniques show a transformation of some of the remaining secondary amide to oxazoline rings during electrodeposition. The baking process converts remaining secondary amide to oxazoline rings.

The unusual throwing power of the bath on electrodeposition is demonstrated by tests wherein a 26 gauge mild steel strip ½ inch in width is inserted into a 10 inch length of steel pipe ¾ inch in diameter and 9 inches of its length is submerged in the bath. It is found under these conditions that at least 40% of the length of the strip will be plated.

In order to indicate the stability and ability of electrolytic baths to be employed continuously for long or indefinite periods of time, the following example is cited:

EXAMPLE XVII

An electrodeposition bath containing approximately 4 liters of the "paint" of Example VII above was subjected to a plating procedure simulating continuous operation in which individual steel panels measuring 3″ by 5″ were immersed and plated for two minutes, after which they were removed from the bath and the next plate given the same treatment. Fifteen thousand panels were coated in this way representing 450,000 square inches of plated surface.

When the solids content of the bath was reduced to approximately 6%, a simple non-volatile test was used to determine the additional solids required. Sufficient concentrate having the composition of Example VII was weighed and added to the bath and stirred until the bath was uniform and distilled water added to restore the bath to its original condition. The pH of the original bath and the make-up paint or vehicle concentrates were maintained between 7.0 and 7.4 since best deposition was obtained in this range although the pH may reach 8.0 when the bath is exhausted to about 5% of solids. Nevertheless, when the needed solids make up is added, the pH will again be reduced to about 7.0 to 7.4.

After adding 8528 grams of paint solids to the original bath (equal to 17 complete changes in solids content) a sample was removed before recharging, centrifuged to remove pigment from suspension and the clear solution was decanted. This solution was then cast on clear polyethylene film, dried in a desiccator, and an infra-red spectrum was obtained using a Beckman IR–5 spectrometer having a range of 2.0 to 16.0 microns.

A sample of the vehicle before being used to make the paint of Example VII or subjected to an electrical current was also cast on polyethylene film, dried in a desiccator, and an infra-red spectrum obtained. A comparison of the two spectrums show little, if any, change indicating that the bath can be used indefinitely with simple make-up techniques and without resort to the difficult and expensive regeneration procedures normally required in the use of paint baths employed in electrodeposition practice.

In order further to illustrate typical operating conditions which may be employed in the practice of the present invention, the following table is cited:

| Example | Time in bath, min. | Electrical potential, v. | Starting load voltage | Maximum amperes | Dry film thickness, mil. |
|---|---|---|---|---|---|
| VII | 2 | 100 | 55 | 3.4 | 0.8 |
| VIII | 2 | 65 | 30 | 2.4 | 0.9 |
| IX | 2 | 60 | 25 | 2.0 | 1.0 |
| X | 2 | 100 | 54 | 3.4 | 0.8 |
| XI | 2 | 125 | 55 | 3.6 | 0.7 |
| XII | 2 | 75 | 25 | 1.2 | 1.0 |
| XIII | 2 | 100 | 50 | 2.2 | 1.5 |
| XIV | 2 | 125 | 42 | 1.9 | 1.2 |
| XV | 2 | 75 | 30 | 0.7 | 1.0 |

Maximum amperes (current flow) as given in the foregoing table refers to the initial amperage surge when the current flow is started. The amperage then drops rapidly as the deposited film insulates the anode against current flow. This surge takes place immediately on contact of the panel with the current. The surge may reach 15 amperes or more with a 3″ x 5″ panel. It is advantageous in continuous operations to have a low amperage surge to minimize voltage control at the beginning of the electrodeposition. After 15 seconds, most of the film is deposted and amperage is reduced rapidly. All of the polymers of the present invention have a low current surge.

While the films produced as described above are generally smooth and glossy, it is also possible to produce very attractive wrinkled films on various substrates by suitable control of the operating conditions as illustrated in the following table:

| Example number | | Panel No. | Electrical potential | Type finish |
|---|---|---|---|---|
| Paint | Vehicle | | | |
| 3″ x 5″ Mild steel panels—red | | | | |
| XIV | VI | 1 | 75 | Smooth, no wrinkles. |
| XIV | VI | 2 | 125 | Wrinkles around edges. |
| XIV | VI | 3 | 150 | Highly uniform wrinkles, med. size. |
| 3″ x 5″ Bonderite 37 panels—red | | | | |
| XIV | VI | 1 | 75 | Smooth, no wrinkles. |
| XIV | VI | 2 | 125 | Do. |
| XIV | VI | 2 | 125 | Do. |
| XIV | VI | 3 | 150 | Do. |
| XIV | VI | 4 | 175 | Highly uniform wrinkles, med. size. |
| 3″ x 5″ Mild steel panels—black | | | | |
| XV | I | 1 | 125 | Smooth, no wrinkles. |
| XV | I | 2 | 150 | Highly uniform wrinkles, med. size. |
| 3″ x 5″ Bonderite 37 panels—black | | | | |
| XV | I | 1 | 125 | Smooth, no wrinkles. |
| XV | I | 2 | 150 | Highly uniform wrinkles, med. size. |

Contact time in the electrodeposition bath was 2 minutes. The panels were rinsed and without predrying, were baked for 15 minutes at 155° C.

It will be apparent from the foregoing table that a difference of 25 volts in potential is the only step needed to produce a highly uniform wrinkle finish of pleasing appearance on a substrate of steel or bonderized steel. However, there appears to be some relation between the electrical conductivity of the substrate and the type of film produced. Thus it is more difficult to produce uniformly wrinkled films on copper and aluminum, presumably because these metals have greater conductivity than steel. Nevertheless, smooth dense films can be readily produced on substantially any electrically conducting substrate by employing the conditions indicated above.

After the film has been deposited, the plated article is removed from the bath and washed with water to remove "drag out". The film is dense and insoluble in water and as a result, it is substantially water free and does not require the usual drying step before baking.

The film is baked at temperatures which may vary from about 100° C. to 500° C. depending upon the duration of the baking process and the hardness of the final film desired. The higher the temperature the shorter the baking time required. Typical baking temperatures and times are generally in the range of about 135 to 250° C. for periods of from about 15 to 40 minutes. However, when baking is carried out at temperatures in the neighborhood of 500° C., no more than 40 to 80 seconds are required.

The baked films obtained in the practice of the present invention are free of pinholes and may be extremely hard and resistant to the action of water and corrosive agents. Thus for example, 3″ by 5″ panels were electroplated with various paint compositions and after the "drag-out" was rinsed off, they were baked for 15 minutes at 155° C. They were then cross scribed to the metal substrate with a knife edge and subjected to the action of an aqueous fog containing 5% of sodium chloride at a temperature of 97° F. The results obtained in which the film was intact and rust (creek at the cross scribes) were not more than 2 mm. are indicated in the ofllowing table:

| Example No. | | Kind of metal | Film thickness, Mils | Sward hardness | 60° specular gloss | Hours exposed |
|---|---|---|---|---|---|---|
| Paint | Vehicle | | | | | |
| VII | I | Fe | 0.7 | 22 | 85 | 100 |
| VIII | I | Bn | 0.8 | 24 | 85 | 400 |
| IX | I | Bn | 0.9 | 30 | 85 | 310 |
| X | II | Bn | 0.8 | 32 | 80 | 300 |
| XI | III | Bn | 0.6 | 18 | 80 | 144 |
| XII | IV | Bn | 0.45 | 18 | 75 | ¹ 170 |
| XVI | I | Cu | .7 | 24 | 95 | ² 1200 |

Fe=Mild steel.
Bn=Bonderite 37.
Cu=Copper.
¹ Oiticica oil was substituted for tung oil.
²=Clear film not cross-scribed.

An aluminum plate coated with the polymer of Example I and containing 75% of total pigment as tribasic lead chromosilicate and 25% iron oxide, was exposed to the salt fog for 360 hours without any apparent deterioration.

Although the foregoing description of the present invention cites numerous compositions, methods of procedure, and operations which may be employed in the preparation and use of compositions in accordance with the present invention, it will be apparent that these may be varied considerably in the practice of the present invention. It should, therefore, be understood that the particular embodiments of the invention and the examples cited are intended to be illustrative only and are not intended to limit the scope of the invention.

What is claimed is:

1. A polymer-forming composition containing
    (a) a dicarboxylic acid adduct which is the product of reaction at a temperature of about 150° C. to about 220° C. between
        (I) one mole of a member selected from the group consisting of tung oil, oiticica oil, eleostearic acid and licanic acid, and
        (II) about 1 to 2.5 moles of an unsaturated dicarboxylic acid containing from 4 to 8 carbon atoms, and
    (b) an oxazoline ring and a polyhydric secondary amide group attached to said dicarboxylic acid adduct, said polymer-forming composition being the product produced by reacting about 8 to 40% by weight, based on the weight of the total composition, of a polymethylol amino compound containing from 4 to 10 carbon atoms, 1 amino group and from 2 to 5 hydroxyl groups with said dicarboxylic acid adduct at a temperature of about 140° C. to 160° C. and maintaining said temperature for a period of time sufficient to split off about 1.5 moles of water per mole of the polymethylol amino compound.

2. A polymer-forming composition as defined in claim 1 wherein said reaction with the polymethylol amino compound is carried out at a temperature of about 145° C. to 155° C. and with from 16 to 25% by weight of said polymethylol amino compound.

3. A polymer-forming composition as defined in claim 2 wherein said unsaturated dicarboxylic acid is selected from the group consisting of
    (a) fumaric acid, maleic acid, citraconic acid, mesaconic acid, itaconic acid, ethyl maleic acid, glutaconic acid, and muconic acid.

4. A polymer-forming composition as defined in claim 1 wherein said polyhydric secondary amide group is (a) 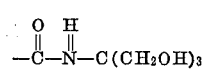

5. An electrolytic aqueous bath containing
    (a) the composition of claim 1.

6. An electrolytic aqueous bath containing
(a) the composition of claim 1, and
(b) pigment.

7. An electrolytic aqueous bath containing
(a) the composition of claim 3.

8. An electrolytic aqueous bath containing
(a) the composition of claim 3, and
(b) pigment.

9. An electrolytic bath containing
(a) from about 3 to about 20 parts by weight of the composition of claim 1,
(b) dissolved in about 100 parts by weight of water, and
(c) having a pH value of from about 6.5 to 8.6.

10. An electrolytic bath containing
(a) from about 3 to about 20 parts by weight of the composition of claim 3,
(b) dissolved in about 100 parts by weight of water, and
(c) having a pH value of about 6.5 to 8.6.

11. An electrolytic bath as defined in claim 9 containing
(a) from about 3 to 15 percent by weight of pigment.

12. An electrolytic bath as defined in claim 10 containing
(a) from about 3 to 15 percent of pigment.

13. An article of manufacture consisting of a body having a water resistant film on a surface thereof composed of a polymerized composition as defined in claim 3.

14. A product which is obtained by preparing
(I) a Diels-Alder addition product by reacting at 200°
  (A) an unsaturated $C_4$ to $C_8$ dicarboxylic acid, with
  (B) a member selected from the group consisting of tung oil, oiticica oil, eleostearic acid and licanic acid,
wherein material I(A) is present in such amount as to constitute 9.0 to 15.0 percent by weight of the total composition, and cooling said product (I) to about 120° C. and adding 8 to 40% by weight, based on the total composition of,
(II) a polymethylol amino compound containing from 4 to 10 carbon atoms, 1 amino group and from 2 to 5 hydroxyl groups, heating to 150° C. to 155° C. and maintaining this temperature for a period of time sufficient to split off 1.5 moles of water per mole of polymethylol amino compound used.

References Cited

UNITED STATES PATENTS

| | | | |
|---|---|---|---|
| 3,366,563 | 1/1968 | Hart et al. | 260—18 X |
| 3,389,145 | 6/1968 | Katz | 260—307 |
| 3,235,547 | 2/1966 | Pollack et al. | 260—307 X |
| 2,564,423 | 8/1951 | Barnum | 260—307 X |
| 2,547,497 | 4/1951 | Rowland | 260—307 X |
| 2,309,243 | 1/1943 | De Groote et al. | 260—307 X |

DONALD E. CZAJA, Primary Examiner

C. W. IVY, Assistant Examiner

U.S. Cl. X.R.

106—287; 204—181; 260—21, 29.2, 37, 307